United States Patent Office

3,589,960
Patented June 29, 1971

3,589,960
METHOD OF MAKING NON-TWISTED CORDAGE
Henry A. Hood, Moorestown, and Warren R. Howard, Beverly, N.J., assignors to Wall Industries, Inc., Beverly, N.J.
Filed May 29, 1967, Ser. No. 641,813
Int. Cl. B65h *81/06;* D07b *5/00*
U.S. Cl. 156—161                        1 Claim

ABSTRACT OF THE DISCLOSURE

Internally bonded cordage material is produced by joining thermoplastic filaments or thermoplastic ribbon with a plastic binder and then crimping or compressing to round out and form a bundle wherein the binder is distributed along the core of the thus-formed cordage article. Externally bonded cordage is produced by setting up an area of false twist within a bundle of filaments and contacting the exterior of the filament bundle with binder strands of molten plastic applied in an oscillating fashion and then releasing the false twist after setting of the plastic binder.

---

Figure 1:
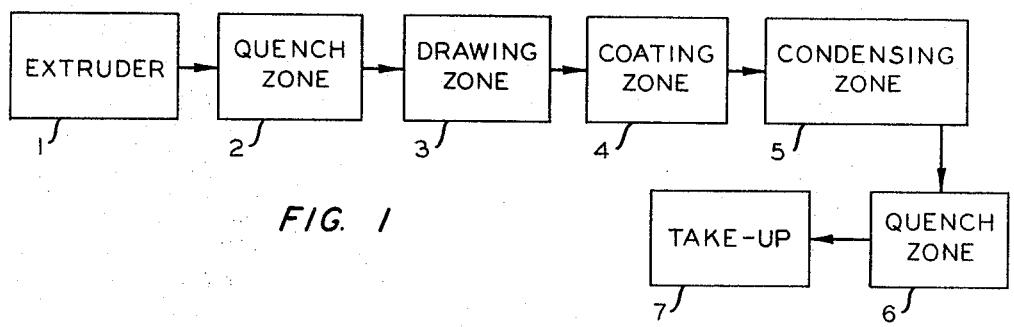

This invention relates to non-twisted cordage and to methods for forming same. In one aspect, the invention relates to a method for forming non-twisted cordage comprising coating thermoplastic filaments arrayed in side-by-side relationship with a molten polymer, either foamed or unfoamed, bringing the thus coated filaments together to form cordage with a core formed of the molten polymer, and quenching the thus formed cordage.

In another aspect, the invention relates to a method for producing non-twisted twine or other articles comprising coating a thermoplastic ribbon, preferably an oriented ribbon, with a molten polymer, which can be foamed or unfoamed, and condensing by transversely compressing the coated ribbon and quenching to form an elongated article useful as twine, with the polymer as the core thereof.

In another aspect, the invention relates to a method for forming non-twisted twine or other articles comprising coating thermoplastic polymeric ribbon, preferably oriented, and either foamed or unfoamed, with a thermosetting adhesive, and transversely compressing or crimping the coated ribbon while heating to set the adhesive, thus forming an elongated article useful as twine, with thermosetting adhesive as the core thereof.

In a further aspect, the invention relates to a method for forming non-twisted elongated articles comprising joining paper coated with a molten, foamed or unfoamed polymer to a thermoplastic polymeric ribbon, preferably oriented, which can be foamed or unfoamed, and compressing or crimping the coated ribbon to form said article with the coated paper as the core thereof.

In accordance with a further aspect, the invention relates to the novel products produced according to the methods of the invention.

In a still further aspect, the invention relates to a method for forming non-twisted elongated articles useful as twine comprising joining paper coated with a thermosetting adhesive to a thermoplastic ribbon, preferably an oriented ribbon made from a foamed or unfoamed polymer, and transversely compressing the ribbon to form said article with the coated paper as the core thereof.

In another aspect, the invention relates to a method for forming non-twisted twine comprising compressing a plurality of thermoplastic filaments onto a strand of paper coated with at least one foamed or unfoamed polymer, preferably a polyolefin, sizing the resulting bundle to form twine with the polymer-coated paper as its core, and allowing the molten polymer at the core of the resulting twine to set.

In still another aspect, the invention relates to a method for producing non-twisted twine comprising setting up an area of false twist in a bundle of thermoplastic polymeric filaments, coating the surface of said area with one or more streams of molten, foamed or unfoamed polymer, cooling the molten polymer, and releasing the false twist.

In still another aspect, the invention relates to non-twisted cordage comprising a sheath of non-twisted thermoplastic filaments, and a polymeric core, which core can be foamed or unfoamed.

In another aspect, the invention relates to non-twisted elongated article useful as twine comprising a sheath formed by a thermoplastic ribbon, preferably made from foamed or unfoamed polymer, and a core comprising paper and thermoset adhesive.

In another aspect, the invention relates to a non-twisted elongated article comprising a sheath of thermoplastic polymeric ribbon, preferably made from foamed or unfoamed polymer, and a core of paper and a polymer which can be foamed or unfoamed.

In another aspect, the invention relates to non-twisted twine comprising a bundle of thermoplastic filaments, preferably oriented polymeric filaments, bound by one or more streams of polymer, preferably a polyolefin polymer, that encircle the bundle in a helical or spiral pattern.

In its several aspects, the invention eliminates the need of a twisting operation in the manufacture of light weight, bulky elongated articles useful as cordage or twine.

Accordingly, it is an object of the invention to form non-twisted cordage having a high bulk-to-weight ratio. It is a further object of the invention to form non-twisted cordage of improved translational efficiency. A further object of the invention is to form light weight, non-twisted bulky baler twine having improved translational efficiency.

In the specification and claims, the phrase "bulky, low-density" means a low weight-to-volume ratio.

Other aspects, objects and advantages of the invention are apparent from the drawings, specification and claims.

The invention provides methods for producing non-twisted elongated articles of the cordage type, such as twine, comprising joining a substrate, preferably thermoplastic polymeric materials, selected from thermoplastic filaments arranged in side-by-side relationship, thermoplastic ribbons, and thermoplastic filaments joined in parallel, to a bulky, low-density material, and bringing together as by transversely compressing or condensing the product thereof to form non-twisted articles useful as twine with the bulky, low-density material at the core thereof. Alternatively, non-twisted articles are produced by false-twisting an area of a bundle of thermoplastic filaments, coating said area with at least one stream of a molten polymer in an oscillating fashion, cooling said area to set the molten polymer, and releasing the false twist.

In another embodiment, thermoplastic polymeric filaments are compressed onto a strand of paper coated with a molten polymer, the resulting bundle is sized to form non-twisted article with the coated paper as the core thereof, and the molten material is allowed to set.

The non-twisted articles produced according to the invention consist of a sheath selected from thermoplastic filaments and a thermoplastic ribbon, preferably produced from foamed or unfoamed thermoplastic polymers, and a core selected from a foamed or unfoamed polymer, paper coated with a thermoset adhesive or a polymer, or a thermoset adhesive alone.

Figure 2:
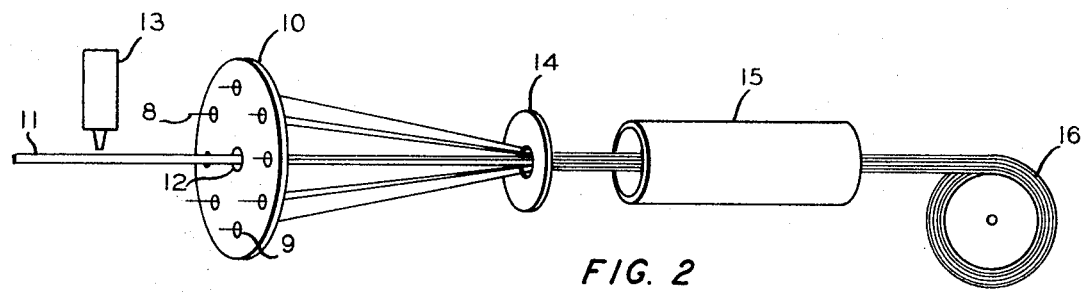
Figure 3:
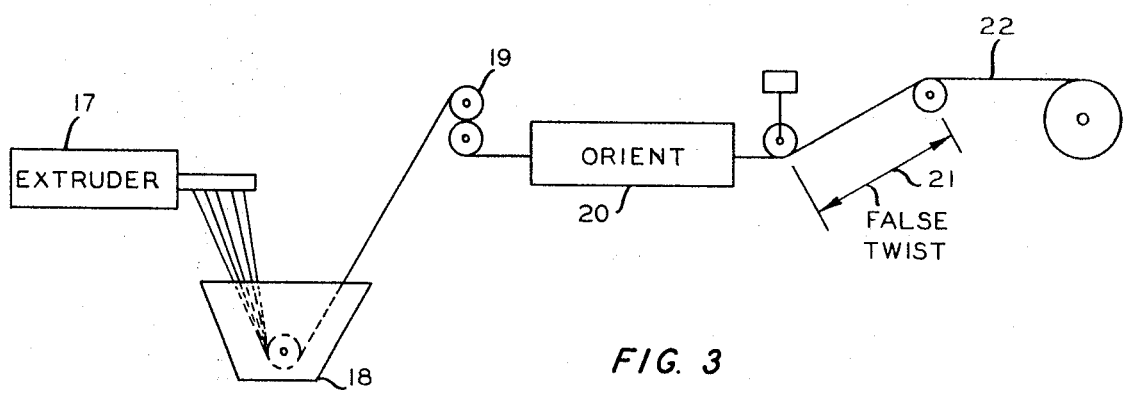
Figure 4:
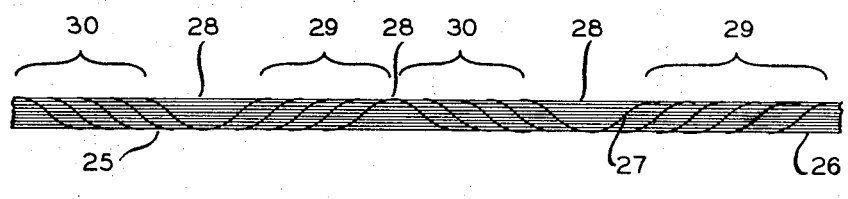
Figure 5:
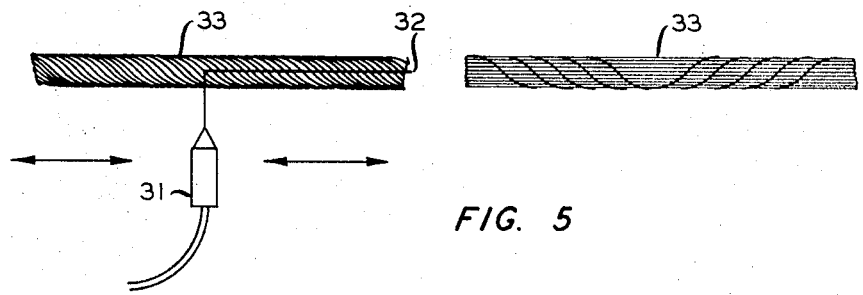
Figure 6:
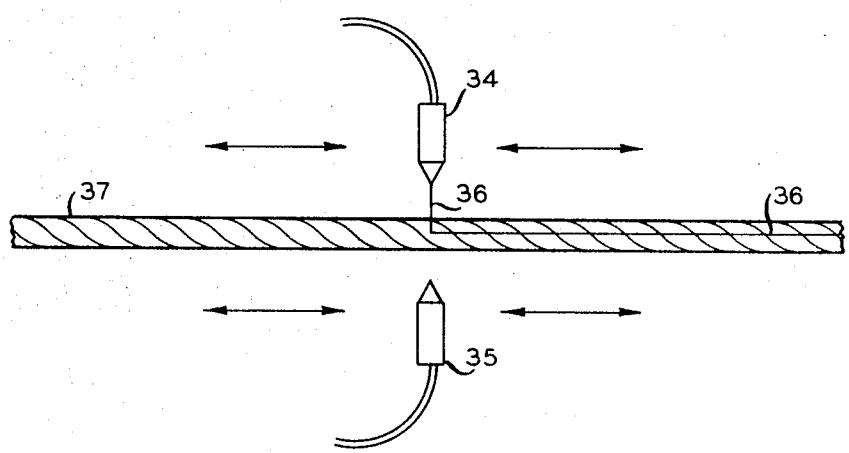

Referring now to the drawings:

FIG. 1 is a diagram of a sequential operation in accordance with some of the embodiments of the invention.
FIG. 2 is a diagram of a sequence of operations in accordance with another embodiment of the invention.
FIG. 3 is a diagram of a sequence of operations including false twisting and binding a plurality of filaments.
FIG. 4 shows the product of the operation shown in FIG. 3. FIGS. 5 and 6 show further details of the operation shown in FIG. 3.

FIG. 1 shows a plurality of thermoplastic polymeric filaments, such as formed from polyproplene, emerging from the diehead of extruder 1. The filaments pass through quench zone 2 where they are cooled, and then to zone 3 where they are heated and drawn to orient same. The filaments emerge from the orienting zone in a side-by-side relationship, and are passed to a coating zone 4 in which they are coated with a molten polymer, which can be the same or can be a different polymer from the filaments and can be foamed or unfoamed. The thus coated filaments are passed to condensing zone 5 wherein they are compacted or brought together by curling or crimping radially to produce non-twisted cordage-type material such as twine, substantially circular in cross-section, with filaments on the outside and the molten coating polymer at the center thereof. The coated filaments are passed to quenching zone 6 where they are cooled. Finally, the cooled filaments are passed to take-up zone 7 where they are wound into suitable packages.

In an alternate embodiment, an extruded, oriented, thermoplastic ribbon, either foamed or unfoamed, is coated with a molten polymer, which can be foamed or unfoamed, and the coated ribbon is then formed into an elongated strand and quenched as in FIG. 1. The ribbon is collapsed or compacted as by rolling transversely to form a strand that, in cross-section, resembles a jelly roll.

The methods of the invention are applicable to substantially all of the normally solid polymers, resin, and plastics, that can be formed into filaments or ribbons or other shapes suitable for use in the various embodiments described herein. Materials which can be formed suitably into filaments, fibers, or ribbons useful herein and which can be oriented include polyamides, polyurethanes, polyethers and anhydrides, and mixed polymers of such compounds, rubber hydrochloride, polyacrylonitrile, polymerizates of vinylidenechloride, styrene, vinyl chloride, vinyl acetate, and copolymers of these, as well as the polyolefins, such as polyethylene and polypropylene.

Polymers of aliphatic mono-1-olefins, such as ethylene, propylene, butene-1, and the like, make excellent filaments or ribbons for use in the invention. Polymers of aliphatic mono-1-olefins having a maximum of eight carbon atoms per molecule and no branching nearer the double bond than the 4-position provide foamed and unfoamed drawn filaments having particularly desirable properties. Homopolymers and copolymers, as well as mixtures of homopolymers and copolymers, are suitable materials for the filaments or ribbons of the invention.

The preparation of oriented foamed polyolefin extrudates, including filaments and ribbons, is described in U.S. Pat. No. 3,214,234 (1965), Bottomley. A suitable method for preparing oriented ribbon and fibers is described in U.S. Pat. No. 3,003,304 (1961), Rasmussen.

The filaments and ribbons used according to the invention can be oriented so as to give optimum strength to these materials for use in the ultimate cordage formed therefrom. Also, as indicated above, the polymers can be either foamed or unfoamed, and foaming is employed, ordinarily, to reduce weight and add bulk. The amount of foaming employed varies according to the polymer type and filament denier, but approximately 15–50 percent voids per strand is suitable for most applications described herein. Foamed filaments, as is well known, have less elasticity and plastic memory than unfoamed filaments. Thus, cordage that is made from foamed filaments ordinarily display less snapback when the bundle breaks because of these properties.

Suitable coating materials that can be used include those thermoplastics described above, and preferably include polyethylene, polypropylene, foamed polyethylene, foamed polypropylene, and other homo- and copolymers of the 1-olefins, either foamed or unfoamed.

In another embodiment, an extruded thermoplastic ribbon, after being extruded, quenched, and oriented, is coated with a suitable thermosetting adhesive and is simultaneously formed into an elongated strand and heated to set the thermosetting adhesive. Suitable thermosetting adhesives are: compounded rubbers, epoxy resins, phenolic compositions, alkyd resins, resorcinol, phenol-resorcinol-formaldehyde blends, and the like.

In another embodiment, an extruded, quenched, oriented thermoplastic ribbon, either foamed or unfoamed, is joined to paper coated with a thermosetting adhesive or a molten polymer, either foamed or unfoamed, and condensed to form non-twisted cordage similar to the previous embodiments, with the coated paper or polymer at the core thereof.

The paper is to be used in the previous embodiment, as well as subsequent embodiments, needs only to be strong enough to hold together during its union with the filaments in the coating operation. The paper used as a filler material can be conveniently kraft paper, which can be unbleached, since it is the most economical to use. Bleached kraft and creped wadding can also be used. It is within the scope of the invention to use a polymer-coated paper such as polyethylene-coated or coated with a hot melt-type adhesive coating formulated from an ethylene-vinyl acetate copolymer/wax mixture, and the like. The paper used can also be modified with fillers, such as clay, chalk, salts, etc., or with sizing compounds, such as rosins, hydrocarbon waxes, starches, glues, sodium silicate, etc., as required for specific end-use needs. The coating applied to the paper can range from about 0.2–1.5 mils, or even thicker and applied in a continuous or pattern fashion, providing adequate adhesion is obtained for the end-use requirement.

The types of polymers used in these embodiments employing paper substrate can be the same as previously described above, preferably polyolefins, due to their light weight and cheapness. Foamed resin is lighter still and would be preferred in the lightest weight bulky cordage. The unfoamed resin provides greater strength, however, and its use in some instances is more desirable than in other applications.

As shown in FIG. 2, a further embodiment comprises simultaneously feeding a plurality of oriented thermoplastic filaments 8 through the outside holes of reeve plate 10, while a strand of paper 11 is fed through the center hole 12 just after coating the paper strand with molten polymer (or thermosetting adhesive) from extruder 13. The coated paper and filaments pass to compressing means 14 where they are compressed to form a non-twisted twine-type article. Thereafter, they pass to cooling zone 15 in order to set the molten polymer. The cooled article is taken up by an appropriate device to form package 16. It should be understood that any means can be used to align the filaments radially around the paper strand, and that the cross-section of the twine can be varied by employing compressing and sizing means of the appropriate size.

Still another embodiment of the invention is shown in FIG. 3, in which a plurality of filaments emerging from extruder 17 are quenched in bath 18, pass over snub rolls 19, undergo longitudinal orientation in heating zone 20, and are given a false twist in zone 21. While the plurality of filaments are false twisted, one or more extruder jets pass back and forth over the area of false twist, coating said area with streams of a molten polymer. The molten polymer is cooled in zone 22 before the false twist on the bundle is released. The cooled article thus formed is then passed to take-up device 23. The finished elongated article consists of a bundle of filaments bound by at least one helical stream of polymer.

If the jet moves opposite to the direction of filament travel, the direction of twist in the binding polymer streams is always opposite to the direction of false twist in the bundle of filaments. The number of turns of the binding streams per unit of filament length is zero at zero jet speed and equal to the number of turns per unit length of false twist in the filament at instantaneous jet speed.

When the jet moves in the same direction as the filaments at any speed between zero and the speed of the filaments, the binding polymer streams have a twist direction the same as the bundle of false-twisted filaments. The bundle will have zero turns per unit length at zero jet speed and an infinite number of turns per unit length when the jet moves at the same speed as the bundle of filaments.

If the jet moves faster than the bundle of filaments in the direction of filament movement, the bundle will have an opposite direction of twist to the false-twisted filaments with the number of turns varying from a maximum of infinity (when jet speed equals filament speed) to a minimum equal to the number of turns of false twist in the bundle of filaments at an instantaneous jet speed.

At absolute jet speed of zero, only a single filament is coated and binding of the filament is not accomplished because the bundle of filaments turns as it passes the stationary jet so that the same filament is continuously exposed to the jet under these conditions.

The above process results in an article of manufacture comprising a plurality of thermoplastic filaments bound by one or more streams which encircle the filaments in a helical or spiral pattern. The direction of encirclement can be clockwise, counter-clockwise, alternately clockwise and counter-clockwise, overlapping clockwise and counter-clockwise, or any combination thereof.

FIG. 4 shows a side view of the product 25, comprised of parallel longitudinal filaments 26 and an encircling bonding filament 27, resulting from the process shown in FIG. 3, and indicates points 28 at which a single jet has changed direction, thus producing alternate clockwise areas 29 and counter-clockwise areas 30 encircling the filament bundle.

FIG. 5 shows a single oscillating jet 31 coating an area of false twist 33 with molten polymer strand 32, and shows the bundle 33 after the false twist was released.

FIG. 6 shows a pair of oscillating jets 34 and 35, each of which alternately feeds a molten stream 36 of polymeric material upon the area of false twist 37. If each jet feeds in only one direction of movement, filament bundle is bound by clockwise or counter-clockwise encirclement alone; if the jets feed in both directions of jet movement, the filament bundle is bound by overlapping clockwise and counter-clockwise encircling strands.

The cross-sectional size of the various products or articles of manufacture described above in connection with the various embodiments can range from about 1/16 inch to 3 inches, or more, in diameter. As to strengths of the resulting products, it can be said that the strength of the cordage produced according to this invention can approach the mathematical sum of the strengths of the individual filaments or ribbon making up the product, since little or no twisting is involved in making these articles. The translational efficiency is higher, which is reflected in the product having a higher strength-to-weight ratio than a twisted product, since the load bearing is more evenly distributed among all of the filaments.

As a representative example of a twine-like material produced according to the invention, a foamed oriented polypropylene baler twine composed of 20 filaments, with a total denier of about 33,000, can be used satisfactorily. Such a twine-like material has a breaking strength of about 200 pounds. As another example, a rope composed of 40 14-mil oriented foamed polypropylene filaments twisted together has a breaking load of about 8,000 pounds. The various individual articles produced by the various embodiments described above can be brought together to form larger articles. Thus groups of smaller non-twisted cord can be either twisted or laid together to form a large twisted rope or they can be put together in parallel relationship with a helical band of polymer holding them together. Thus, it can be seen from the above descriptions that methods are provided for producing individual strands of high strength which can be ultimately used, together with other strands, to form cordage materials having very desirable properties.

The specific example describes in detail the manufacture of non-twisted twine by the process described with reference to FIG. 3.

EXAMPLE

Fiber grade polypropylene containing sufficient foaming agent to give about a 0.6 g./cc. drawn strand is extruded through a filament die at a melt temperature of 400° F. The number of filaments in the fiber bundle is 20. The bundle immediately quenched and then reheated and oriented to yield a fiber bundle with a total denier of about 20,000.

The filaments are oriented by passing them through a radiantly heated zone about 12 feet long. The undrawn fibers enter the zone at about 60 feet per minute and exit from this zone at about 500 feet per minute. The oriented fiber bundle then passes to the coating zone at this linear speed, and is given a false twist of about 24 turns per foot over a distance of two feet. A binding filament of molten polypropylene is placed on the bundle by an oscilating jet. The jet moves about 170 feet per minute when it travels in the same direction as the fiber bundle. In the reverse direction, the speed of the jet is about 100 feet per minute. Immediately after the coating operation, forced cooling is used to set the binding strand. The oscillating operation results in a binding filament with an effective twist of 6 turns per foot alternating in both clockwise and counterclockwise directions after the false twist is removed from the fiber bundle. Finally, the product is wound on the takeup package.

The filaments and ribbons used in the invention are preferably oriented to strengthen them, usually by heating and drawing under conditions to substantially elongate and cause orientation with the resultant strengthening of the filaments and ribbons. Suitable conditions of temperature for orienting polyolefins, for example, range from 120° F. to 340° F. Draw ratios of 2 to 20 can be suitably employed. As indicated above, polymeric thermoplastic filaments and ribbons are preferred, particularly those made from 1-olefins, such as ethylene and propylene, butene, and copolymers thereof.

From the foregoing disclosure, it will be apparent that many different embodiments of this invention can be made without departing from the spirit and scope thereof.

We claim:

1. The method of forming non-twisted elongated cordage comprising providing a bundle of extruded thermoplastic filaments extending side by side in approximately parallel relationship, imparting to said bundle a temporary false twist, and while the bundle is so twisted applying to its surface at least one stream of a molten thermoplastic polymer, and permitting said applied polymer to set by cooling, so that when said false twist is released the set applied thermoplastic polymer provides a helical-type binding holding together the filaments of said bundle.

References Cited

UNITED STATES PATENTS

| | | | |
|---|---|---|---|
| 2,689,813 | 9/1954 | Lawrence | 156—180 |
| 2,775,860 | 1/1957 | Morrison | 156—180X |
| 3,126,312 | 3/1964 | Nickerson | 156—166X |
| 3,151,011 | 9/1964 | Troelman et al. | 156—180 |
| 3,222,149 | 12/1965 | Drummond | 156—167 |
| 3,258,378 | 6/1966 | Kelsey | 156—161 |
| 3,388,030 | 6/1968 | Estes et al. | |

BENJAMIN R. PADGETT, Primary Examiner

U.S. Cl. X.R.

156—180, 244, 290, 296